United States Patent
Kabuk

(10) Patent No.: US 11,906,629 B2
(45) Date of Patent: Feb. 20, 2024

(54) METHOD AND DEVICE FOR DISTANCE MEASUREMENT

(71) Applicant: Microvision, Inc., Redmond, WA (US)

(72) Inventor: Ünsal Kabuk, Hamburg (DE)

(73) Assignee: Microvision, Inc., Redmond, WA (US)

( * ) Notice: Subject to any disclaimer, the term of this patent is extended or adjusted under 35 U.S.C. 154(b) by 385 days.

(21) Appl. No.: 17/010,764

(22) Filed: Sep. 2, 2020

(65) Prior Publication Data

US 2021/0063579 A1 Mar. 4, 2021

(30) Foreign Application Priority Data

Sep. 4, 2019 (EP) .................................. 19195290

(51) Int. Cl.
*G01S 17/894* (2020.01)
*G01S 7/48* (2006.01)
(Continued)

(52) U.S. Cl.
CPC ............ *G01S 17/894* (2020.01); *G01S 7/484* (2013.01); *G01S 7/487* (2013.01); *G01S 7/4808* (2013.01); *G01S 7/4865* (2013.01)

(58) Field of Classification Search
CPC ...... G01S 17/894; G01S 7/4808; G01S 7/484; G01S 7/4865; G01S 7/487; G01S 7/48;
(Continued)

(56) References Cited

U.S. PATENT DOCUMENTS

2009/0060273 A1* 3/2009 Stephan ................. G06V 20/58
382/103
2011/0102763 A1 5/2011 Brown
(Continued)

FOREIGN PATENT DOCUMENTS

DE 10147807 4/2003
DE 102011089629 6/2012
(Continued)

OTHER PUBLICATIONS

European Search Report for EP19195290 issued by the European Patent Office dated May 15, 2020, with English translation (6 pages).

(Continued)

*Primary Examiner* — Jonathan M Hansen
(74) *Attorney, Agent, or Firm* — Kevin D. Wills

(57) ABSTRACT

A method for optical distance measurement, comprising a creation of at least one frame, including determining 3D information of at least one subregion of a measuring region. A time budget for creating the frame is split between a first phase for assessing at least one region of interest, and a second phase for determining 3D information from the at least one region of interest. During the first phase a plurality of measuring pulses is emitted by a transmitting unit, and reflected measuring pulses are received by a receiving unit, wherein 2D information of the measuring region is determined, wherein at least one region of interest is assessed from the 2D information. During the second phase a plurality of measuring pulses is emitted by a transmitting unit, and reflected measuring pulses are received by the receiving unit, wherein 3D information of the at least one region of interest is determined as part of the second phase.

21 Claims, 2 Drawing Sheets

(51) Int. Cl.
*G01S 7/484* (2006.01)
*G01S 7/4865* (2020.01)
*G01S 7/487* (2006.01)

(58) Field of Classification Search
CPC ........ G01S 7/4802; G01S 17/10; G01S 17/86;
G01S 17/89; G01S 17/931; G01S 7/481;
G01S 7/4861; G01S 7/4863; G01S 17/26;
G01S 13/89; G01S 17/02
See application file for complete search history.

(56) References Cited

U.S. PATENT DOCUMENTS

| | | | | |
|---|---|---|---|---|
| 2011/0188708 | A1* | 8/2011 | Ahn | G06K 9/00 |
| | | | | 382/106 |
| 2014/0159925 | A1* | 6/2014 | Mimeault | G01S 7/484 |
| | | | | 340/935 |
| 2017/0272651 | A1 | 9/2017 | Mathy | |
| 2018/0113216 | A1 | 4/2018 | Kremer | |
| 2019/0178974 | A1* | 6/2019 | Droz | G01S 7/4815 |
| 2019/0180453 | A1* | 6/2019 | Silva | G01B 11/2545 |
| 2019/0188541 | A1* | 6/2019 | Wang | G01C 3/08 |
| 2022/0004739 | A1* | 1/2022 | Vaello Paños | G01S 7/4802 |

FOREIGN PATENT DOCUMENTS

| | | |
|---|---|---|
| DE | 112017005641 | 8/2019 |
| EP | 3531167 | 8/2019 |
| JP | 1995333339 | 12/1995 |
| JP | 1999153664 | 6/1999 |
| JP | 2001050723 | 2/2001 |
| JP | 2019049480 | 3/2019 |
| JP | 2019060652 | 4/2019 |
| WO | 2018100082 | 6/2018 |
| WO | 2018126248 | 7/2018 |

OTHER PUBLICATIONS

Office Action issued in Japanese Patent Application No. JPO 2020-148160 mailed from the Japanese Patent Office dated Nov. 2, 2021.

* cited by examiner

METHOD AND DEVICE FOR DISTANCE MEASUREMENT

This application claims the benefit of European Patent Application No. 19195290.2, filed Sep. 4, 2019, which is incorporated in its entirety herein by reference.

BACKGROUND OF THE INVENTION

1. Field of the Invention

The invention relates to a method as well as to a device for optical distance measurement.

2. Discussion of the Related Art

Optical distance measurements, in particular for use in the driverless navigation of vehicles, are known from the prior art. They are based on the time-of-flight principle, wherein measuring pulses, which are reflected on objects, are emitted periodically and the reflected measuring pulses are detected. From the determination of the time-of-flight of the measuring pulses from the sensor to the objects and back, a conclusion can be drawn to the distance to these objects with the help of the speed of light.

A corresponding device for optically measuring distances is typically formed as LIDAR-sensor (abbreviation for "Light Detection and Ranging"), which consists of a transmitting and a receiving unit, which can efficiently sense a measuring region, without using mechanical parts thereby. On the transmission side, electronic scan methods can be used thereby, for example the selective addressing of laser diodes or optical phased arrays. On the reception side, arrays of receiving elements can likewise be used to receive the reflected measuring pulses. The large amount of receiving elements cannot be evaluated simultaneously due to the limited amount of memory, the amount of data to be handled, and the power consumption of the receiving unit. In the prior art, this limits the number of receiving elements, which can be read and processed during a time interval (frame rate).

On the reception side, the resolution and the measuring region can be changed by the use of various lenses, but the number of receiving elements is always predetermined. As a result, a large measuring region can only be measured with low resolution, because the number of the receiving elements is predetermined. The range and the signal-to-noise ratio (SNR) are furthermore also smaller due to the divergence of the individual receiving elements, so that the performance of the method as well as of the device are reduced.

SUMMARY OF THE INVENTION

Several embodiments of the invention advantageously address the needs above as well as other needs by providing a method for optical distance measurement, wherein the method comprises a creation of at least one frame, wherein 3D information of at least one subregion of a measuring region is determined as part of the frame, characterized in that the method comprises the splitting of a time budget for creating the frame between a first phase for assessing at least one region of interest, and a second phase for determining 3D information from the at least one region of interest, wherein the method comprises the performance of the first phase, wherein a plurality of measuring pulses is emitted by means of a transmitting unit, and reflected measuring pulses are received by a receiving unit as part of the first phase, wherein 2D information of the measuring region is determined as part of the first phase, wherein at least one region of interest is assessed from the 2D information, wherein the method comprises the performance of the second phase, wherein a plurality of measuring pulses is emitted by means of a transmitting unit, and reflected measuring pulses are received by the receiving unit as part of the second phase, wherein 3D information of the at least one region of interest is determined as part of the second phase.

In another embodiment, the invention can be characterized as a device for optical distance measurement, characterized in that the device is configured to carry out the above-described method, wherein the device comprises a transmitting unit for emitting measuring pulses for the first phase, and a transmitting unit for emitting measuring pulses for the second phase, and wherein the device comprises a receiving unit for receiving reflected measuring pulses of the first phase and of the second phase.

In yet another embodiment, the invention can be characterized as a computer program product, which comprises a computer-readable storage device, on which a program is stored, which, after it was loaded into the memory of the computer, makes it possible for a computer to carry out the above-described method.

In yet another embodiment, the invention can be characterized as a computer-readable storage device, on which a program is stored, which, after it was loaded into the memory of the computer, makes it possible for a computer to carry out the above-described method.

BRIEF DESCRIPTION OF THE DRAWINGS

The above and other aspects, features and advantages of several embodiments of the present invention will be more apparent from the following more particular description thereof, presented in conjunction with the following drawings.

DETAILED DESCRIPTION

Figure 1:
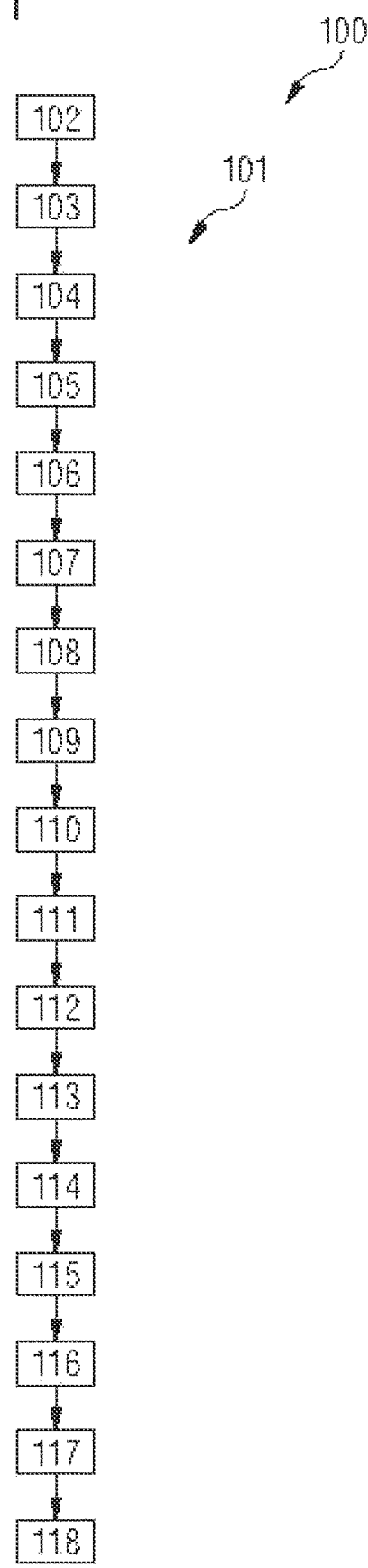
FIG. 1 is a process diagram of a method according to the invention for distance measurement.

It is the object of the present invention to improve a method for optical distance measurement and a corresponding device in such a way that a measuring region, which is as large as possible, can be measured cost-efficiently and reliably in such a way that a range, which is as large as possible, but simultaneously a resolution, which is as high as possible, of interesting regions are attained.

The afore-mentioned object is solved by means of a method for optical distance measurement, wherein the method comprises a creation of at least one frame, in particular of a plurality of frames. 3D information of at least one subregion of a measuring region is determined as part of the frame. A frame is understood as a single image. The term "3D information" is to in particular be understood as distance information, in other words depth information, about at least one subregion of the measuring region. In particular a 3D depth map of at least one subregion of the measuring region is determined.

Several frames are created, in particular in chronological order. The rate at which the method creates frames is in particular referred to as frame rate. A frame can thus be considered to be 3D information, in other words a three-dimensional "image" of at least one subregion of a measuring region, which is determined within the time interval allocated to the frame. The subregion is preferably a region of interest.

The method comprises the splitting of a time budget for creating the frame between a first phase for assessing at least one region of interest, and a second phase for determining 3D information from the at least one region of interest. The time budget is in particular a time interval, which is allocated to the frame. It results in particular from the frame rate.

The term "region of interest" is in particular a "field of interest". The region of interest is a subregion of the measuring region. According to the invention, the term "measuring region" in particular refers to a three-dimensional space, from which reflections of the emitted measuring pulses can be and/or are to be received. In other words, the term is to be understood as a region, which is to be measured. The measuring region can be, but does not have to be technical, but can be selected deliberately. It is thus a region, which is to be "measured", in other words sensed, by means of the method according to the invention.

The method comprises the performance of the first phase, wherein a plurality of measuring pulses is emitted by means of a transmitting unit, and reflected measuring pulses are received by a receiving unit as part of the first phase.

The transmitting unit comprises in particular a plurality of transmitting elements, wherein each transmitting element preferably sends at least one measuring pulse into a defined subregion of the measuring region. Each transmitting element is thus assigned to a certain subregion, in other words, to a spatial element of the measuring region. The same applies for the receiving unit. The latter comprises a plurality of receiving elements, wherein a subregion of the measuring region is assigned to each receiving element. This results in particular in an unambiguous assignment between the respective transmitting elements of the transmitting unit and the receiving elements of the receiving unit. From the fact which receiving element thus receives a measuring pulse, a conclusion can be drawn about the position of the reflecting object, at which the measuring pulse was reflected. Each transmitting element can in particular be controlled individually. Each receiving element can in particular further be evaluated individually.

2D information of the measuring region is determined as part of the first phase. A 2D intensity image of the measuring region is created. In other words, the received accumulated intensity can thus be determined for each receiving element in order to create the intensity image.

Depth information is in particular not evaluated as part of the first phase. According to the invention, 3D information of the measuring region is thus not determined as part of the first phase. The times-of-flight of the measuring pulses of the first phase are not evaluated. At least one region of interest is assessed from the 2D information. In other words, the method identifies at least one region of interest.

The method further comprises the performance of the second phase. A plurality of measuring pulses is emitted by means of a transmitting unit, and reflected measuring pulses are received by the receiving unit as part of the second phase. The receiving unit of the second phase is the same receiving unit of the first phase. On the reception side, the same unit is thus used for the first phase and the second phase. A camera can generally support the determination of 2D information, in that it provides an image of the measuring region. However, the 2D information, which is determined with the help of the first phase, is in particular not provided externally, in other words determined by means of further sensors, for example a radar sensor or a camera, but internally, i.e. by means of the same device for performing the method.

3D information of the at least one region of interest is determined as part of the second phase. Measuring pulses are in particular emitted into the at least one, previously assessed, region of interest, as part of the second phase. Transmitting elements, which correspond to the corresponding spatial position of the region of interest in the measuring region, are in particular controlled selectively. The time-of-flight of the measuring pulses is determined by means of the reflected measuring pulses, and distance information and thus also 3D information of the at least one region of interest is thus determined. Measuring pulses can also be emitted into other subregions of the measuring region, which were not identified as region of interest, as part of the second phase. The 3D information can be present as part of a 3D depth map of at least one region of interest. A 4D map can further be created in that intensity values, for example from the first phase, are added.

The method can further also comprise further phases, wherein at least one phase represents a first phase for assessing at least one region of interest, and at least one phase represents a second phase for assessing 3D information of the at least one region of interest.

All 3D information, in particular a distance value, is determined by means of a histogram. Several measuring cycles are in particular performed as part of the first and/or of the second phase. In the case of one measuring cycle, at least one measuring pulse for each transmitting element or relevant transmitting element, respectively, is sent (relevant, because it is assigned, for example, to a relevant spatial region). The time-of-flight of all received measuring pulses is determined. The times-of-flight of all measuring pulses, which are sent by a transmitting element, and which are received by the corresponding receiving element, are entered in a histogram. The times-of-flight of several adjacent receiving elements can further also be entered in a common histogram. In other words, one histogram per receiving element or block of receiving elements, respectively, can be created per frame. A distance value is determined from each histogram, which is then assigned to the spatial element, which corresponds to the receiving element or to the block of receiving elements, respectively.

The above method is then in particular performed for all frames. The splitting of the time budget for creating a frame between the first phase and the second phase can thereby be determined or is determined dynamically for each frame, in particular as a function of 2D or 3D information from the previous frame.

The first phase in particular serves the purpose of "roughly" sensing the measuring region, in order to identify possibly interesting regions (regions of interest). The second phase, in contrast, focusses on sensing these interesting regions with the highest possible resolution. The portion of the time budget, which is assigned to the first phase, is in particular significantly smaller than the portion, which is assigned to the second phase. According to the invention, the portion of the time budget for the first phase corresponds to maximally 50%, in particular maximally 30%, of the portion of the second phase. The entire time budget for the first and the second phase is in particular at least 10 ms, preferably at least 20 ms, most preferably at least 30 ms, and/or maximally 100 ms, preferably maximally 70 ms, most preferably maximally 50 ms.

The measuring pulses, which are emitted in the first phase, in particular have a pulse length of at least 100 picoseconds, further preferably at least 1 nanosecond, preferably at least 10 nanoseconds, and/or maximally 100 nanoseconds, preferably maximally 50 nanoseconds. The measuring pulses, which are emitted in the first phase, can further have a pulse length of at least 1 microsecond, preferably at least 10 microseconds, and/or maximally 100 microseconds, preferably maximally 50 microseconds. Many short and/or few long measuring pulses with the above-mentioned pulse lengths can be emitted in the first phase. The entire first phase can thus have a duration of at least 1 ms, preferably at least 5 ms, and/or maximally 15 ms, in particular maximally 10 ms, in particular maximally 7 ms.

The measuring pulses, which are emitted in the second phase, in particular have a pulse length of at least 100 picoseconds, further preferably at least 1 ns, in particular at least 2 ns, most preferably at least 3 ns, and/or maximally 50 ns, most preferably maximally 30 ns.

The method for the first phase can in particular exclusively use a first transmitting unit, and exclusively a second transmitting unit for the second phase, wherein the first transmitting unit and the second transmitting unit differ. This applies in particular for several frames. The first transmitting unit and the second transmitting unit can in particular be configured identically. The transmitting units can further be configured specifically for the phase assigned to them. The transmitting unit for the first phase can thereby comprise LEDs as transmitting elements, while the transmitting unit, which is responsible for the second phase, comprises VCSEL.

The method can further alternately use a first transmitting unit and a second transmitting unit, which differ, for different frames for the first phase and the second phase. In other words, the first transmitting unit is responsible for the first phase in the case of a first frame, while a second transmitting unit performs the second phase. In the case of a second frame, the roles of the transmitting units are then reversed. This can have the advantage that an even use of the transmitting units takes place and a premature aging of individual components is avoided. An even use is then in particular relevant, because the first phase and the second phase differ in their use of the transmitting units, because the transmitting elements are thermally stressed to different degrees.

The first phase advantageously takes place parallel in time to the second phase, wherein measuring pulses of at least one phase are encoded in order to differentiate the measuring pulses of the first phase and the measuring pulses of the second phase. A parallel first and second phase requires that a second transmitting unit and a first transmitting unit are used, as described above. All transmitting elements, which are assigned to a transmitting unit, are in particular always assigned to the same phase at a point in time. The encoding serves for an unambiguous assignment of received measuring pulses to the first phase or the second phase. An encoding can in particular take place by the use of pulse sequences.

The method can further use only a single transmitting unit, wherein the method uses the transmitting unit by means of time multiplexing for the first phase and for the second phase. Due to the time multiplexing, the measuring pulses of the first phase and of the second phase can be differentiated.

Compared to the first phase, in particular measuring pulses with a higher intensity and/or larger pulse length and/or higher pulse rate, in other words more measuring pulses per time unit, can be emitted in the second phase. The intensity and/or pulse length and/or pulse rate of the measuring pulses of the second phase in particular corresponds to at least 1.2-times, preferably at least to 1.5-times, most preferably at least to 2-times, the corresponding parameter of the first phase. Compared to the first phase, more measuring cycles can be performed and/or more measuring pulses per measuring cycle can be emitted in the second phase.

The pulse rate can in particular be increased via the "round trip time limit". The round trip time limit is in particular a "minimum distance" of two measuring pulses emitted one after the other, because twice the time-of-flight of the measuring pulse has to be awaited until the end of the measuring region, in order to be able to unambiguously differentiate two emitted measuring pulses from one another. In response to an exceeding of the round trip time limit, in particular encoded sequences are used to be able to correctly assign received measuring pulses. More energy is used in the second phase, in particular in that measuring pulses with higher pulse intensity are used, and the range is thus increased. Due to an increased pulse rate, more measuring pulses are further used, and the range is thus also increased.

The first phase can in particular be understood as scan phase, wherein this is not a scanning in terms of a complete sensing of the measuring region, but refers to a scanning in terms of a finding of interesting regions. In contrast, the second phase can in particular be understood as focused measuring phase for receiving depth information. The limited hardware as well as the limited time budget can thus be used effectively, while the SNR is simultaneously increased. A large range of the method and a high resolution of the at least one region of interest is attained, so that it is in particular possible to detect very small objects at a great distance.

The method can comprise the defining of an illumination, in particular for the first and/or second phase, wherein it is in particular defined thereby, which subregion of the measuring region or whether the entire measuring region is illuminated. In particular the entire measuring region can be sensed as part of the first phase. The illumination would then comprise the entire measuring region.

As part of the first phase, the method can further use at least one randomized illuminating sequence, i.e. a sequence of random illuminating patterns, to emit the measuring pulses, wherein the 2D information of the measuring region is determined by means of reconstruction. The different, random illuminating patterns are advantageously created by the emitting transmitting unit itself. No further elements are in particular used in the beam path, for example mirrors, to create the illuminating patterns. Based on the knowledge of the illuminating patterns, the determination of the 2D information can take place very quickly by means of reconstruction, wherein at least one region of interest can be derived from the 2D information. The above-mentioned steps are in particular referred to as "compressive sensing".

As part of the first phase, at least one neural network can further be used to determine the at least one region of interest. The method can further comprise an image processing, with the help of which regions of interest are derived from the 2D information.

The receiving elements are in particular evaluated by means of evaluating units. As part of the second phase, receiving elements for determining the 3D information of the at least one region of interest, receiving elements with regard to the at least one region of interest, as well as receiving elements with regard to at least one subregion of the measuring region located outside of the at least one region of interest, can be evaluated. With regard to the region of interest, more receiving elements are evaluated simultaneously as part of the evaluation than in the subregion of the measuring region located outside of the at least one region of interest. With regard to the region of interest, receiving elements can further be evaluated in a less combined manner compared to the subregion of the measuring region located outside of the at least one region of interest.

Measuring pulses can be sent into the region of interest as well as into the subregion of the measuring region located outside of the at least one region of interest. The measuring pulses, which are sent into the region of interest, are sent by a first group of transmitting elements. The first group of transmitting elements is assigned to the spatial region of the region of interest. The first group of the transmitting elements is further assigned to corresponding receiving elements, namely to a first group of receiving elements. Vice versa, measuring pulses are emitted by a second group of transmitting elements into at least one subregion of the measuring region located outside of the at least one region of interest. The second group corresponds to the subregion and to a second group of receiving elements.

Compared to the second group of receiving elements, more receiving elements of the first group of receiving elements can be evaluated simultaneously in order to attain a resolution, which is as high as possible. This is attained in particular in that as many receiving elements as possible are assigned to respective evaluating units and can thus be evaluated individually. Outside of the region of interest, thus relating to the second group of the receiving elements, receiving elements can be evaluated in a combined manner. This is attained in in particular in that the combined receiving elements are assigned to a common evaluating unit, which thus averages the information received accordingly. It is attained thereby that the at least one subregion of the measuring region located outside of the at least one region of interest has a coarser resolution. This relates in particular to the entire remainder of the measuring region, except for the regions of interest. Subregions of the measuring region, which are located outside of the regions of interest, can further also not be evaluated at all.

Relating to the at least one region of interest, that is, with regard to the first group of receiving elements, receiving elements can likewise be evaluated in a combined manner, wherein fewer receiving elements than relating to the second group are combined. The term "less combined" is to thus be understood in such a way that fewer receiving elements are assigned to the same evaluating unit. In other words, fewer receiving elements of the receiving elements, which are assigned to the region of interest, are assigned to a common evaluating unit, than in a subregion of the measuring region located outside of the region of interest. A 1:1 assignment between receiving elements and evaluating units is at hand in particular with regard to the region of interest. A 2:1 or 3:1 or 4:1 assignment is in particular at hand on the outside.

The first group of transmitting elements can moreover emit measuring pulses, the pulse rate of which varies. The first group of transmitting elements could further perform more measuring cycles than the second group of transmitting elements. In addition, more measuring pulses can be emitted per measuring cycle per transmitting element compared to the second group of transmitting elements. The pulse length and the pulse intensity of the measuring pulses of the first group can be set, in order to obtain a histogram with SNR, which are as large as possible. The pulse rate, the number of the measuring pulses at a pulse rate, the pulse lengths, and/or the pulse intensities of the second group of the transmitting elements can be smaller compared to the first group. As a whole, the mentioned parameters are set as a function of the entire time budget in such a way that a real time capability of the system is made possible.

Outside of the region of interests, the corresponding receiving elements can in particular be assigned to the remaining evaluating units or can also not be evaluated at all. The result is a splitting of the measuring region between regions with very high resolution (the regions of interest) and regions with lower resolution. Based on this principle, it is possible to evaluate a very large number of receiving elements by means of only a very limited number of evaluating units.

The term "less combined" can also be understood such that times-of-flight with respect to at least one region of interest is entered in histograms in a less combined manner compared to times-of-flight of receiving elements of a subregion of the measuring region located outside of the at least one region of interest. In other words, the times-of-flights of several, adjacent receiving elements can be entered in a common histogram in the case of the second group of receiving elements. The first group could, for example, be subdivided in such a way that the times-of-flight of 2, 3, or 4 receiving elements are entered in a common histogram. In the case of the first group of receiving elements, the times-of-flight of each receiving element can be entered in a separate histogram, or at least the number of the receiving elements, which is assigned to a common histogram, can be smaller than in the case of the second group. The effect of the "less combined" evaluation is a better resolution. If, for example, fewer receiving elements are assigned to a common histogram, the spatial resolution is better, because the distance value determined by means of the histogram is thus assigned to a smaller pixel block.

Different regions of interest can be classified as being varied in relevance, namely preferably compared to one another, as part of the first phase. The method thus advantageously comprises the identification of regions of interest of varied relevance compared to one another. More receiving elements can be evaluated simultaneously compared to a region of interest of less relevance as part of the evaluation of a more relevant region of interest, and/or wherein receiving elements are evaluated in a less combined manner compared to a less relevant region of interest as part of the evaluation of a more relevant region of interest.

Of the receiving elements, which are assigned to a more relevant region of interest, fewer receiving elements are in particular assigned to a common evaluating unit than in a less relevant region of interest. With regard to the more relevant region of interest, in particular a 1:1 assignment between receiving elements and evaluating units is at hand. With regard to a less relevant region of interest, a 2:1 or 3:1 or 4:1 assignment is preferably at hand.

In a further aspect, the present invention relates to a device for optical distance measurement. The device comprises in particular a transmitting unit for emitting measuring pulses for the first phase, and a transmitting unit for emitting measuring pulses for the second phase. These can be different transmitting units or the same transmitting units. The device further comprises one single receiving unit for receiving reflected measuring pulses of the first phase and of the second phase.

The device further comprises evaluating units for evaluating the receiving elements of the receiving unit, and thus for determining 2D information of the measuring region as part of the second phase, and the assessment of regions of interest from the 2D information, as well as for determining 3D information as part of the second phase. The evaluating units are in particular each formed by time-of-flight counters, so-called time to digital converters.

The device is in particular a LIDAR sensor, in particular a solid state LIDAR sensor, which in particular does not comprise any mechanical parts for diverting measuring pulses.

A transmitting unit is in particular an array of transmitting elements, wherein the transmitting elements can be addressed individually and selectively. The transmitting elements are in particular VCSEL, that is, surface emitters. The transmitting unit can further be an optical phased array. The transmitting elements can further be laser diodes, fiber lasers, or LEDs. The transmitting elements can further comprise addressable liquid crystals.

The receiving elements are in particular detectors, in particular in the form of an array, preferably a focal plane array, in particular an APD array, most preferably a SPAD array. The array can further comprise quantum film structures based on quantum dots. The receiving elements in particular form pixels.

The device advantageously comprises a region of interest assessing unit, which serves the purpose of assessing the regions of interest on the basis of the 2D information. It can in particular use "compressive sensing" and/or an image processing and/or at least one neural network. The region of interest assessment unit can further define the size and/or the relevance of the regions of interest, and/or can already identify possible objects, which are located in the region of interest.

The device can further comprise an allocating unit, which is formed in particular to determine an illumination on the transmitting side, for example at least one illuminating sequence, in the first phase and/or second phase, and, based thereon, assign transmitting units, which perform the illumination. The assigning unit further in particular serves the purpose of specifying the illumination in the second phase in such a way that the regions of interest have the highest possible resolution, while regions located outside of the regions of interest have a coarser resolution or no resolution at all. This takes place in particular in consideration of parameters, such as the time budget, in particular the portion thereof for the first phase and the second phase, the hardware, in particular the limited number of evaluating units, as well as receiving elements and transmitting elements, and/or the regions of interest assessed in the first phase, in particular the size and/or relevance thereof. The allocating unit thus allocates transmitting elements on the transmitting side, in order to attain a certain illumination. It further assigns evaluating units to the corresponding receiving elements, namely as a function of whether the receiving element is assigned to a region of interest, and/or as a function of the size and/or relevance thereof. This serves the purpose of attaining a highest possible resolution of the at least one region of interest.

The region of interest assessing unit and the allocating unit could thereby be embodied by one single unit.

The device further comprises a control unit, which controls the transmitting elements and/or the receiving elements and/or the evaluating units on the basis of the information from the assigning unit.

FIG. 1 shows a process diagram of a method 100 according to the invention for distance measurement.

The method 100 comprises the creation 101 of at least one frame, wherein 3D information of at least one subregion of a measuring region is determined as part of the frame. A time budget for the frame is split 102 between a first phase for assessing at least one region of interest and a second phase for determining 3D information from the at least one region of interest.

The method 100 comprises the performance 103 of the first phase, wherein a plurality of measuring pulses is emitted 107 as part of the first phase by means of a transmitting unit 11, and reflected measuring pulses are received 108 by means of a receiving unit 12. Based on the reflected measuring pulses, 2D information of the measuring region is determined 109. In particular a 2D intensity image is further created 110.

An illumination for the first phase can further be determined 104 as part of the first phase. Based on the illumination, transmitting elements can be assigned 105 on the transmitting side, with the help of which the illumination is implemented. An assignment 106 on the receiving side of evaluating units 15 to receiving elements 12a can further take place, in order to evaluate the reflected measuring pulses.

At least one region of interest is assessed based on the 2D information of the measuring region. In particular "compressive sensing" and/or a neural network and/or an image processing can be used thereby. The size and the relevance of the region of interest can moreover be determined.

The method 100 further comprises the performance 112 of the second phase, wherein a plurality of measuring pulses is again emitted 116 by means of a transmitting unit 11, and reflected measuring pulses are received 117. 3D information of the at least one region of interest is further determined 118 as part of the second phase.

An illumination for the second phase, which determines, which subregions of the measuring region are illuminated, is also preferably determined 113 as part of the second phase. This relates in particular to the regions of interest, which were determined beforehand. On the transmitting side, transmitting elements are again assigned 114 to the illumination of the second phase, and, on the receiving side, evaluating units are assigned 115 to the receiving elements 12a, so that the regions of interest can have the highest possible resolution.

Figure 2:
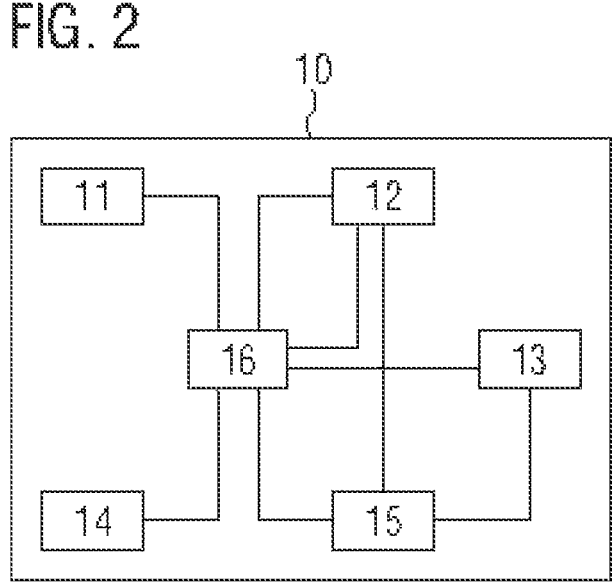
FIG. 2 is a schematic diagram of a device according to the invention for distance measurement.

FIG. 2 shows a device 10 for measuring distances, which has a transmitting unit 11 comprising transmitting elements, and a receiving unit 12 comprising receiving elements 12a.

The device 10 further comprises a region of interest assessment unit 13, which is formed to determine 109 the regions of interest on the basis of the 2D information from the first phase. The device 10 comprises evaluating unit 15, which serves to evaluate the reflected measuring pulses, which are detected by the receiving elements 12a. The device 10 further comprises an allocating unit 14, which is configured to assign transmitting elements to a previously defined illumination of the first phase and/or of the second phase on the transmitting side, and to assign evaluating units to the receiving elements 12a on the receiving side, as a function of how highly a corresponding subregion of the measuring region is to be resolved. The device 10 further comprises a control unit 16, which is configured to control the afore-mentioned units.

Figure 3:
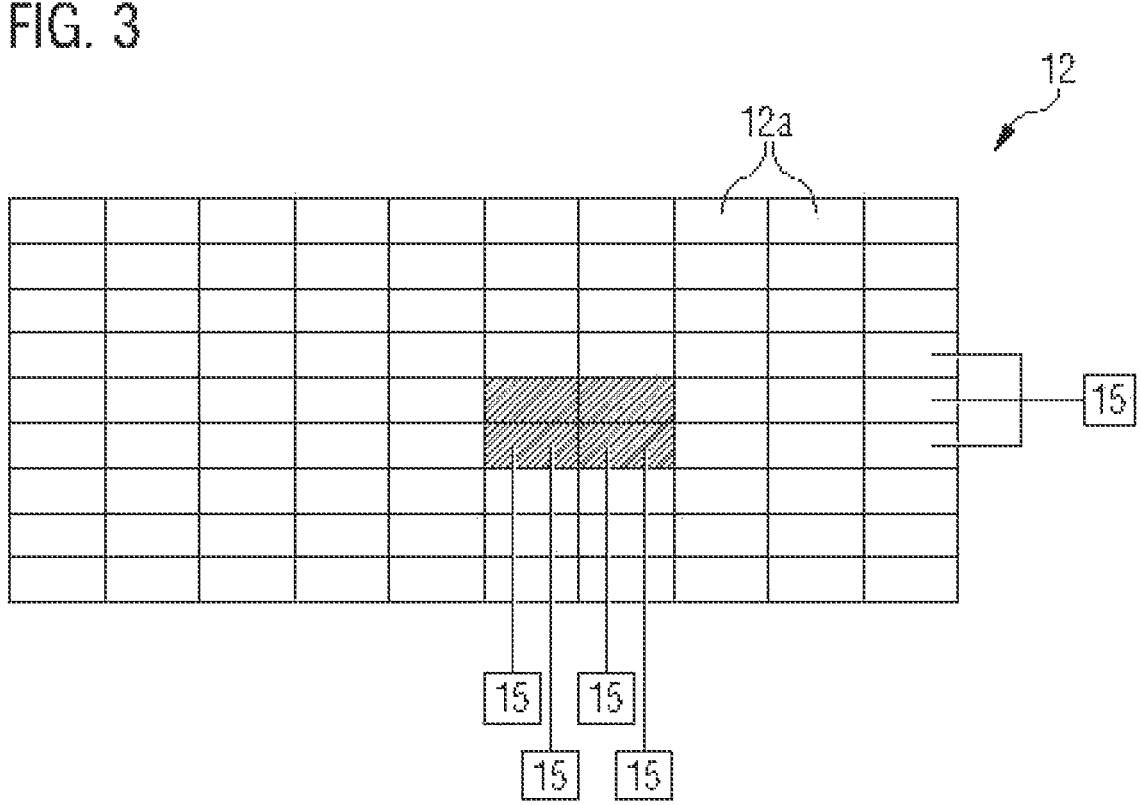
FIG. 3 is a top view onto a receiving unit of the device according to FIG. 2.

FIG. 3 shows a top view onto the receiving unit 12 of the device of FIG. 2, wherein the individual receiving elements 12a can be seen clearly.

It is illustrated in FIG. 3, how four shaded receiving elements 12a are assigned to a region of interest, which was assessed as part of a first phase. So that the region of interest can be measured with a high resolution as part of the second phase, a separate evaluating unit 15 is in each case assigned to each of these four receiving elements 12a. The usual receiving elements 12a of the receiving unit 12 are evaluated in a combined manner. It is suggested as an example, how three receiving elements 12a, which are not assigned to a region of interest, are assigned to a common evaluating unit 15.

What is claimed is:

1. A method for optical distance measurement, comprising:

for a first phase of a frame of the optical distance measurement,
    emitting a first plurality of measuring pulses from at least one transmitting unit, where the at least one transmitting unit comprises a plurality of transmitting elements each configured to emit measuring pulses to a measuring region;
    receiving first reflected measuring pulses using at least one receiving unit, wherein the at least one receiving unit comprises a plurality of receiving elements configured to receive reflections of the measuring pulses from the measuring region;
    determining 2D information for at least a portion of the measuring region based on the received first reflected measuring pulses received in the first phase; and
    determining at least one region of interest from the 2D information, wherein the at least one region of interest is a subregion of the measuring region; and for a second phase of the frame of the optical distance measurement,
    assigning receiving elements in the plurality of receiving elements to evaluating units in a plurality of evaluating units based at least in part on the determined at least one region of interest such that at least some of the receiving elements corresponding to outside the at least one region of interest are assigned to common evaluating units in the plurality of evaluating units;
    emitting a second plurality of measuring pulses from the transmitting unit;
    receiving second reflected measuring pulses at the at least one receiving unit; and
    evaluating received second reflected measuring pulses received by the receiving elements in the second phase to determine 3D information for at least a portion of the measuring region, where the received second reflected measuring pulses are each evaluated by an evaluating unit assigned to a receiving element that received the second reflected measuring pulse.

2. The method of claim 1, wherein the receiving elements corresponding to the at least one region of interest are each assigned to at least one evaluating unit.

3. The method of claim 1, wherein the receiving elements corresponding to the at least one region of interest are assigned to the evaluating units at a 1:1 ratio or less, while the receiving elements corresponding to outside to the at least one region of interest are assigned to evaluating units at a 2:1 ratio or greater.

4. The method of claim 1, wherein the received second reflected measuring pulses received by the receiving elements assigned to common evaluating units are evaluated in a combined manner while the received second reflected measuring pulses received by the receiving elements corresponding to the at least one region of interest are each evaluated by at least one evaluating unit.

5. The method of claim 1, wherein the 2D information comprises a 2D intensity image.

6. The method of claim 1, wherein the at least one transmitting unit comprises a first transmitting unit used in the first phase and a second transmitting unit used in the second phase.

7. The method of claim 1, wherein the first phase takes place parallel in time to the second phase, and wherein measuring pulses of at least one phase are encoded in order to differentiate the received first reflected measuring pulses of the first phase and the received second reflected measuring pulses of the second phase.

8. The method of claim 1, wherein the method uses the at least one transmitting unit by means of time multiplexing for the first phase and for the second phase.

9. The method of claim 1, wherein the second plurality of measuring pulses emitted in the second phase have a higher intensity and/or larger pulse length and/or higher pulse rate compared to the first plurality of measuring pulses emitted in the first phase.

10. The method of claim 1, wherein as part of the first phase, the method uses at least one randomized illuminating sequence to emit the first plurality of measuring pulses, and the 2D information of the measuring region is determined by means of reconstruction.

11. The method of claim 1, wherein times-of-flight of received second reflected measuring pulses are determined and are entered in a histogram as part of the evaluating received second reflected measuring pulses received by the receiving elements in the second phase to determine the 3D information for at least the portion of the measuring region, wherein times-of-flight of received second reflected measuring pulses corresponding to the at least one region of interest are entered in histograms in a less combined manner compared to times-of-flight of received second reflected measuring pulses corresponding to outside the at least one region of interest.

12. The method of claim 1, wherein a portion of a time budget for the first phase is maximally 50% of the portion of a time budget for the second phase.

13. A device comprising:
    at least one transmitting unit, where the at least one transmitting unit comprises a plurality of transmitting elements each configured to emit measuring pulses to a measuring region;
    at least one receiving unit, where the at least one receiving unit comprises a plurality of receiving elements configured to receive reflections of the measuring pulses from the measuring region;
    a plurality of evaluating units coupled to the at least one receiving unit to evaluate reflected measuring pulses received by assigned receiving elements;
    and wherein the device is adapted to, for a first phase of a frame of an optical distance measurement,
        emit a first plurality of measuring pulses from the at least one transmitting unit;
        receive first reflected measuring pulses using the at least one receiving unit;
        determine 2D information for at least a portion of the measuring region based on the received first reflected measuring pulses received in the first phase; and
        determine at least one region of interest from the 2D information, wherein the at least one region of interest is a subregion of the measuring region;
    and wherein the device is adapted to, for a second phase of the frame of an optical distance measurement,
        assign receiving elements in the plurality of receiving elements to evaluating units in the plurality of evaluating units based at least in part on the determined at least one region of interest such that at least some of the receiving elements corresponding to outside the at least one region of interest are assigned to common evaluating units in the plurality of evaluating units;

emit a second plurality of measuring pulses from the transmitting unit;

receive second reflected measuring pulses at the at least one receiving unit; and evaluating received second reflected measuring pulses received by the receiving elements in the second phase to determine 3D information for at least a portion of the measuring region, where the received second reflected measuring pulses are each evaluated by an evaluating unit assigned to a receiving element that received the second reflected measuring pulse.

14. The device of claim 13, wherein the receiving elements corresponding to the at least one region of interest are each assigned to at least one evaluating unit.

15. The device of claim 13, wherein the receiving elements corresponding to the at least one region of interest are assigned to the evaluating units at a 1:1 ratio or less, while the receiving elements corresponding to outside to the at least one region of interest are assigned to evaluating units at a 2:1 ratio or greater.

16. The device of claim 13, wherein the received second reflected measuring pulses received by the receiving elements assigned to common evaluating units are evaluated in a combined manner while the received second reflected measuring pulses received by the receiving elements corresponding to the at least one region of interest are each evaluated by at least one evaluating unit.

17. The device of claim 13, wherein the 2D information comprises a 2D intensity image.

18. The device of claim 13, wherein the at least one transmitting unit comprises a first transmitting unit used in the first phase and a second transmitting unit used in the second phase.

19. The device of claim 13, wherein the second plurality of measuring pulses emitted in the second phase have a higher intensity and/or larger pulse length and/or higher pulse rate compared to the first plurality of measuring pulses emitted in the first phase.

20. The device of claim 13, wherein times-of-flight of received second reflected measuring pulses are determined and are entered in a histogram as part of the evaluating received second reflected measuring pulses received by the receiving elements in the second phase to determine the 3D information for at least the portion of the measuring region, wherein times-of-flight of received second reflected measuring pulses corresponding to the at least one region of interest are entered in histograms in a less combined manner compared to times-of-flight of received second reflected measuring pulses corresponding to outside the at least one region of interest.

21. The device of claim 13, wherein a portion of a time budget for the first phase is maximally 50% of the portion of a time budget for the second phase.

* * * * *